United States Patent
Nicolai et al.

(10) Patent No.: US 10,800,352 B2
(45) Date of Patent: Oct. 13, 2020

(54) FIREWALL

(71) Applicant: Adler Pelzer Holding GmbH, Hagen (DE)

(72) Inventors: Norbert Nicolai, Schermbeck-Gahlen (DE); Volkmar Schulze, Schierling (DE); Marco Schneider, Essen (DE); Rod Morris-Kirby, Padstow Cornwall (GB)

(73) Assignee: Adler Pelzer Holding GMBH, Hagen (DE)

( * ) Notice: Subject to any disclaimer, the term of this patent is extended or adjusted under 35 U.S.C. 154(b) by 221 days.

(21) Appl. No.: 15/574,045

(22) PCT Filed: May 18, 2016

(86) PCT No.: PCT/EP2016/061126
§ 371 (c)(1),
(2) Date: Nov. 14, 2017

(87) PCT Pub. No.: WO2016/184906
PCT Pub. Date: Nov. 24, 2016

(65) Prior Publication Data
US 2018/0297539 A1    Oct. 18, 2018

(30) Foreign Application Priority Data
May 19, 2015  (DE) .......... 10 2015 209 105

(51) Int. Cl.
*B60R 13/08* (2006.01)
*G10K 11/168* (2006.01)

(52) U.S. Cl.
CPC .......... *B60R 13/083* (2013.01); *G10K 11/168* (2013.01)

(58) Field of Classification Search
CPC .......... B60R 13/083; G10K 11/168
(Continued)

(56) References Cited

U.S. PATENT DOCUMENTS 7,838,125 B2   11/2010  Pelzer et al.
8,770,343 B2 *  7/2014  Mathur ................ B64C 1/066
                                                        181/210
(Continued)

FOREIGN PATENT DOCUMENTS

CN    1950239 A    4/2007
CN    104554068 A  4/2015
(Continued)

OTHER PUBLICATIONS

Rabbi et al., Incorporation of Nanofiber Layers in Nonwoven Materials for Improving Their Acoustic Properties; Journal of Engineered Fibers and Fabrics, vol. 8, Issue Apr. 2013, http://www.jeffjournal.org.
(Continued)

*Primary Examiner* — Forrest M Phillips
(74) *Attorney, Agent, or Firm* — Clements Bernard Walker; Seth L. Hudson

(57) ABSTRACT

The invention relates to an acoustic component contoured in a planar manner or three-dimensionally shaped, namely a firewall of a motor vehicle, and use of said component, said component comprising at least one sound-absorbing material and possibly at least one carrier material, wherein the sound-absorbing material is completely or partially covered by a flow layer at least on a planar side or in a composite of layers, wherein the flow layer has nanofibers.

9 Claims, 1 Drawing Sheet

(58) Field of Classification Search
USPC .......................................................... 181/290
See application file for complete search history.

(56) References Cited

U.S. PATENT DOCUMENTS

| | | |
|---|---|---|
| 2008/0173497 A1 | 7/2008 | Kalinova et al. |
| 2010/0170746 A1 | 7/2010 | Restuccia et al. |
| 2013/0098707 A1* | 4/2013 | Yamamoto ............ B60R 13/083 181/290 |
| 2013/0112499 A1* | 5/2013 | Kitchen .................... B32B 5/26 181/296 |
| 2013/0115837 A1 | 5/2013 | Kitchen et al. |
| 2013/0118831 A1* | 5/2013 | Kawai ................. G10K 11/168 181/290 |
| 2014/0216847 A1 | 8/2014 | Blinkhorn et al. |
| 2014/0224576 A1 | 8/2014 | Staudt |
| 2014/0246268 A1* | 9/2014 | Fushiki .................... B32B 5/18 181/290 |
| 2016/0118033 A1* | 4/2016 | Owen, Jr. .............. G10K 11/16 181/290 |
| 2016/0129855 A1* | 5/2016 | Check .................. B60R 13/083 181/290 |
| 2016/0201318 A1* | 7/2016 | Israel .................... E04B 1/8209 181/290 |

FOREIGN PATENT DOCUMENTS

| | | |
|---|---|---|
| DE | 101 43 167 A1 | 3/2003 |
| DE | 10 2004 050 649 A1 | 5/2005 |
| DE | 600 21 177 T2 | 4/2006 |
| DE | 10 2004 053 751 A1 | 5/2006 |
| DE | 10 2008 025 840 A1 | 12/2009 |
| DE | 10 2010 033 959 A1 | 2/2011 |
| DE | 10 2009 044 649 A1 | 3/2011 |
| DE | 10 2010 035 431 A1 | 3/2012 |
| DE | 10 2012 216 500 A1 | 3/2014 |
| EP | 1 101 218 B1 | 7/2002 |
| GB | 391942 A | 5/1933 |
| WO | 98/18656 A1 | 5/1998 |
| WO | 2004/107314 A1 | 12/2004 |
| WO | 2014/111067 A2 | 7/2014 |
| WO | 2014/111068 A2 | 7/2014 |

OTHER PUBLICATIONS

Dr. Christian Adlhart, Dünne Fasern—Grosse Wirkung : Mit ElektrospinnIng Zu Neuen Produkten; TextilePlus Textile Zukunft; Ausgabe May 6, 2014; pp. 44-45,47.
International Search Report for International Application No. PCT/EP2016/061126 dated Aug. 26, 2016.

* cited by examiner

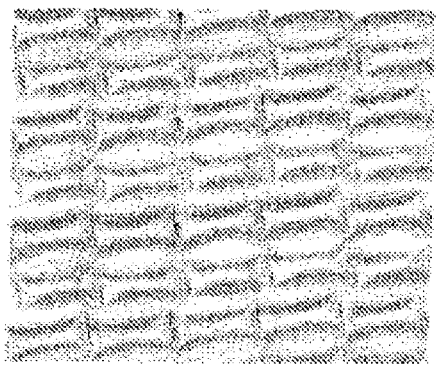

FIREWALL

FIELD OF THE INVENTION

The invention relates to an acoustically effective component that is two-dimensionally contoured or three-dimensionally shaped, i.e., within the meaning of the present invention, a firewall of a motor vehicle, and the use thereof The invention comprises at least one sound-absorbing material, i.e., a three-dimensionally shaped absorber, and optionally at least one support material, wherein said sound-absorbing material, i.e., a three-dimensionally shaped absorber with one or more layers, is covered on at least one major surface thereof or in a layer composite by a flow layer on the entire surface or partially, which flow layer is directly applied to the absorber and consists of or comprises nanofibers. In particular, the flow layer is applied directly to the support material, on the entire surface thereof or partially.

BACKGROUND OF THE INVENTION

Sound-absorbing materials (absorbers) that cover the absorber by an additional flow layer completely (on both sides) or only on one side and thus improve the acoustic properties are known.

Depending on the material employed, such components may also offer thermal protection.

DE 10 2004 050 649 A1 describes a sound-absorbing heat shield with a sheet metal carrier plate which holds an acoustically and thermally effective insulation layer. The heat shield comprises a protective sheet having microperforations and provided on the side of the insulation layer facing a sound source when in use.

A heat- and sound-insulating lining for the engine compartment of motor vehicles, which is described in DE 101 43 167 A1, consists of a heat reflector microperforated on the engine side, in contact with a polyurethane foam layer which is impregnated on the engine side with thermoset material having long-term temperature resistance of 200° C., especially of 150° C., for three weeks, in contact with a cover layer facing away from the engine side.

The production of microperforated sheets, especially metal foils, has long been known. For example, reference may be made to U.S. Pat. No. 7,838,125 B2, in which a specific embodiment of a microperforated metal foil is described. It is described that the metal foil is deformed by needle punching in such a way that a crater elevated with respect to the mean sheet layer level whose lower edge frays when the needle punctures through is formed against the needle puncture direction.

Structures in which compressed non-wovens are employed as the flow layer are known. WO 98/18656 describes a multilayer structure consisting of at least one porous cushioning layer and a microporous reinforcing layer, wherein said layer has a flow resistance of R=900 Nsm$^{-3}$ to 2000 Nsm$^{-3}$. In a particular embodiment, an air gap exists between said cushioning layer and the car body.

WO 2004/107314 A1 describes a sound absorber structure of two interconnected non-woven-fiber textiles, with thermoplastic and/or duroplastic bonding, with different thicknesses, densities, basis weights and flow resistances of the layers. The structure has a metal layer and therefore is not open to flow as a whole.

DE 10 2004 053 751 A1 describes a trim part for a vehicle, especially underbody paneling. It has a porous middle layer and at least one cover layer on either side, the porous middle layer has such a structure that it possesses acoustic transparency or acoustically absorbing effectiveness. Said acoustically absorbing porous middle layer may be covered by one or more acoustically transparent or absorbing cover layers on one or both sides thereof.

For the interior area of a motor vehicle, structures with an absorber and a microperforated polymer sheet are known. EP 1 101 218 B1 describes a microperforated polymer sheet for use in a sound absorber designed with a polymer sheet of a defined thickness and several microperforations, wherein said microperforations each have a narrowest diameter that is smaller than the sheet thickness and a broadest diameter that is larger than 125% of the narrowest diameter.

Thus, a microperforated plastic sheet with a defined perforation geometry that depends on the sheet thickness is described. In particular, perforation channels of a columnar or conical shape with variable diameters are described.

DE 10 2010 035 431 A1 describes a structure in which an absorber material is completely enclosed by a flow layer, in this case a microperforated sheet. In the structure shown, the enclosed absorber material is loose and not deformed.

DE 10 2012 216 500 A1 describes a multilayer perforated sound absorber with a microperforated plastic sheet, an adhesive layer, and a thermodeformable absorber comprising a foam layer, a fiber fabric, or a fibrous web layer. In this specification, the influence of processing on the flow layer, which changes its flow resistance by relaxation and bonding, is taken into account.

It is generally known that the acoustic effect of, for example, non-woven materials can be influenced by a nanofiber coating (A. Rabbi et al.; Incorporation of Nanofiber Layers in Nonwoven Materials for Improving Their Acoustic Properties; Journal of Engineered Fibers and Fabrics, Volume 8, Issue 4—2013, see also C. Adlhart; Dunne Fasern—grosse Wirkung: Mit Elektrospinning zu neuen Produkten; Textil Plus May/June 2014).

All mentioned flow layers consist of natural fiber, plastic or bicomponent (BiCo) material and are thus combustible; on the other hand, the non-combustible solutions consisting of metal or inorganic material have a clearly higher weight. According to the structure of the flow layer, there are different sizes and distributions of the pores. A variation of the basis weight and thus a distribution of the flow resistance always result in fibrous components, depending on the production of the flow layer.

Two-dimensionally contoured components based on sound-absorbing materials provided with a layer containing nanofibers are known in an exemplary way, for example, from DE 10 2008 025 840 A1, DE 10 2009 044 649 A1, US 2014/0224576 A1, US 2008/0173497 A1, WO 2014/111068 A2, WO 2014/111067 A2, US 2013/0112499 A1, US 2013/0115837 A1, US 2014/0216847 A1, US 2010/0170746 A1, DE 600 21 177 T2 and DE 10 2010 033 959 A1.

BRIEF SUMMARY OF THE INVENTION

The object of the present invention as compared to the above mentioned prior art is to apply a flow layer of nanofibers directly to a three-dimensionally deformed component, namely an absorptive firewall.

The above object is achieved by a broad-band sound absorber, namely a firewall, with a high acoustic insulation and the features of claim 1. Preferred embodiments can be seen from the claims depending thereon, and the use claims.

BRIEF DESCRIPTION OF THE DRAWINGS

The present invention is illustrated and described herein with reference to the various drawings, in which like reference numbers denote like method steps and/or system components, respectively, and in which:

FIG. 1 illustrates the firewall of the present invention.

DETAILED DESCRIPTION OF THE INVENTION

The present invention describes acoustic components, namely firewalls, consisting of an absorptive material, optionally in a layer composite, and optionally support and intermediate layers, which are covered with a very lightweight and acoustically homogeneous flow layer, especially consisting of nanofibers, completely, i.e., on both sides, or partially, i.e., on one side thereof and/or on selected surface areas of one or both sides of the sound-absorbing material. The nanofiber layer (flow layer) can be applied directly to the absorber material (sound-absorbing material) on the one hand, or using a support layer, on the other. Also, said nanofiber layer may be present between different absorber material and support layers.

In an essential embodiment, the absorber of the firewall is formed from foam, bonded fibers, bonded foam particles, or a mixture thereof, optionally in a layer composite, three-dimensionally in accordance with the component contour, and covered with nanofibers throughout the surface on one side thereof or completely.

In another preferred embodiment, the absorber material is not bonded, and is present between two circumferentially contacting textile supports open to flow and having a coating containing nanofibers.

For the use between two walls, the support layer that is open to flow is shaped in such a way that a wall gap is formed at least on one side, preferably on both sides. Said gap is mostly within a range of 1 mm (net air gap) and/or about three quarters of the available building space. Optionally, the lightweight acoustic component may fill the entire building space.

In the above mentioned embodiment, the coating (the nanofiber layer) is defined in such a way that over the area, a uniform or defined varying basis weight, i.e., one that is unequal partially over the area, and thus locally different flow resistances are formed.

The majority of acoustically effective components in vehicles is two-dimensional, mostly contoured two-dimensional, has a three-dimensional and essentially flat shape and contacts the car body, so that a partial coating with nanofibers is fully purposeful in such cases. Of course, for components in a cavity, a full-area nanofiber coating, i.e., one provided on both sides, is also useful.

As a loose as well as bonded/shaped filler material, the known absorber materials are employed: synthetic fibers, especially polyester fibers, polyamide fibers, especially nylon 6 and/or nylon 66; polyolefin fibers, especially PP and/or PE; acrylic fibers and their fiber mixtures including bicomponent fibers and multicomponent fibers and/or mixtures of natural fibers, especially raw cotton, hemp, cocoa, kenaf, jute and/or sisal fibers, with the above mentioned synthetic fibers; animal, metallic or inorganic fibers as well as materials mainly functioning as spacers (spacer knittings, particle foam, etc.); further PUR foam.

As a blank material and as a material for molded parts, except for the materials serving as spacers, the same materials can be employed, which are bonded, however, through binder materials (BiCo fibers, plastic powders), or mechanical bonding (needling, stitching).

Textile sheets open to flow or three-dimensional textile structures, such as woven fabrics, loop-formingly knitted fabrics, loop-drawingly knitted fabrics, braiding, stitch-bonded fabrics, non-woven fabrics and felts as well as the three-dimensional textile structures (body structures), such as textile tubes, are employed as the support layer.

The materials for textile supports are dependent on the application field: plastic materials (PA, PP, PET, aramids, etc.); natural fibers (linen, cotton, etc.), inorganic and metallic fibers (glass, carbon, aluminum, etc.).

A broad range of materials is available as nanofibers. There can be employed almost all plastic materials; as well as fibers based on natural materials, and metallic and inorganic fibers. Nanofibers within the meaning of the present invention include, in particular, fibers having a fiber diameter of smaller than 900 nanometers (nm), preferably within a range of from 50 to 800 nm, more preferably from 75 nm to 300 nm.

According to the invention, nanofibers are preferably processed in or on a composite non-woven and on three-dimensionally predeformed components.

For synthetic fiber non-wovens, this means that they are combined already during the preparation, for example, by electrospinning, with other methods, such as melt spinning and others, and thus can form a composite with microfibers. In addition, support or protection non-wovens may be included additively in said micro-nano fiber composite, so that a composite fiber non-woven is formed. In glass fiber mats, the nozzle blowing method for preparing air filter non-wovens with nanoscale fibers is widespread.

In the claimed acoustic components, namely the firewall, the basis weight of the nanofibers is preferably from 0.01 $g/m^2$ to 15 $g/m^2$, especially from 0.2 $g/m^2$ to 1.5 $g/m^2$, based on the flow layer.

The flow resistance of the flow layer is preferably from 500 $Ns/m^3$ to 100,000 $Ns/m^3$, more preferably from 3,000 $Ns/m^3$ to 20,000 $Ns/m^3$. For components with a complete area coverage, the flow resistances should be in the upper range and may be equal or different for each side.

Through the height of the flow resistance, the ratio of absorptive to isolating effect of the component can be adjusted.

The present invention improves the homogeneity of the pore distribution by using nanofibers for forming the flow layer, thereby shifting the scale for describing both the size of the cavities and their relative arrangement to smaller dimensions. If the specific flow resistance of the flow layer is too high, the sound cannot penetrate into the backside absorber and is reflected in a wide area. The component essentially behaves as an insulator. If the flow resistance of the flow layer is very low (open), essentially only the absorber is acting.

EXAMPLES

Example 1/Comparative Example 1

The application of the invention shall be demonstrated for components according to the invention.

In a first application, a firewall of the prior art for a luxury car with a spring-mass structure consisting of a commercially available elastic foam and a commercially available thermoplastic heavy layer with an average basis weight of 4 $kg/m^2$ was replaced by a so-called dual impedance structure.

The dual impedance structure consists of a core prepared in a fiber injection method and consisting of a fiber mixture with 20% by weight PET BiCo fibers, 40% by weight cotton recycling fibers, and 40% by weight PET fibers. The support non-woven consists of a 40 $g/m^2$ PET non-woven and is uniformly coated with 0.8 g/m² PA nanofibers (continuous fibers). The support non-woven with nanofibers (of the flow layer) was press-bonded onto the fiber absorber by means of a commercially available PE adhesive at 20 g/m² at a temperature above the melting temperature of the PE. The thus prepared firewall was lighter by about 5 kg than the serial firewall, and by only 0.5 points worse than the serial firewall in a subjective evaluation in a rating within the scope of a driving test. With a locally limited mass density, the same acoustic effect could be achieved with a saving in weight of 3 kg.

Example 2

In another application, a three-dimensionally shaped absorber prepared in a fiber injection method and consisting of 25% by weight PET BiCo fibers, 40% by weight cotton recycling fibers and 35% by weight PET fibers was applied directly on one side with a 0.6 g/m² PA nanofiber coating, the flow layer.

The invention claimed is:

1. A three-dimensionally shaped acoustically effective firewall of a motor vehicle comprising at least one three-dimensionally shaped absorber with one or more layers that is covered on at least one major surface thereof by a flow layer on the entire surface or partially, which flow layer is directly applied to the absorber and consists of nanofibers, wherein the flow resistance of the flow layer is equal or different in a locally defined way, said flow layer is sandwiched between several loosely stacked or compressed layers and said absorber, the thickness of said firewall is equal throughout its area or different in a locally defined way, said nanofiber layer has a flow resistance that is different in a locally defined way over the component, the firewall further comprises a support material open to flow, wherein said support open to flow with the absorber and the flow layer comprises several loosely stacked or compressed layers.

2. The firewall according to claim 1, characterized in that said absorber material is covered on both major surfaces on the entire surface or partially with said flow layer.

3. The firewall according to claim 1, characterized by comprising a layer composite of from 2 to 5 layers of the absorber and of the flow layer.

4. The firewall according to any of claim 1, characterized in that the flow resistance of the flow layer(s) is from 500 Ns/m³ to 100,000 Ns/m³.

5. The firewall according to claim 1, characterized in that said flow layer is applied to one side of said support open to flow, which is provided on the absorber and/or functions as a coating.

6. The firewall according to claim 1, characterized in that said support open to flow with the absorber and the flow layer comprises from 3 to 7 loosely stacked or compressed layers.

7. The firewall according to claim 1, characterized in that said nanofiber layer has a flow resistance that is uniform over the component.

8. The firewall according to claim 1, wherein the firewall is used at a distance to a solid wall.

9. The firewall according to claim 1, wherein the firewall is used at a distance to an adjacent component.

* * * * *